UNITED STATES PATENT OFFICE.

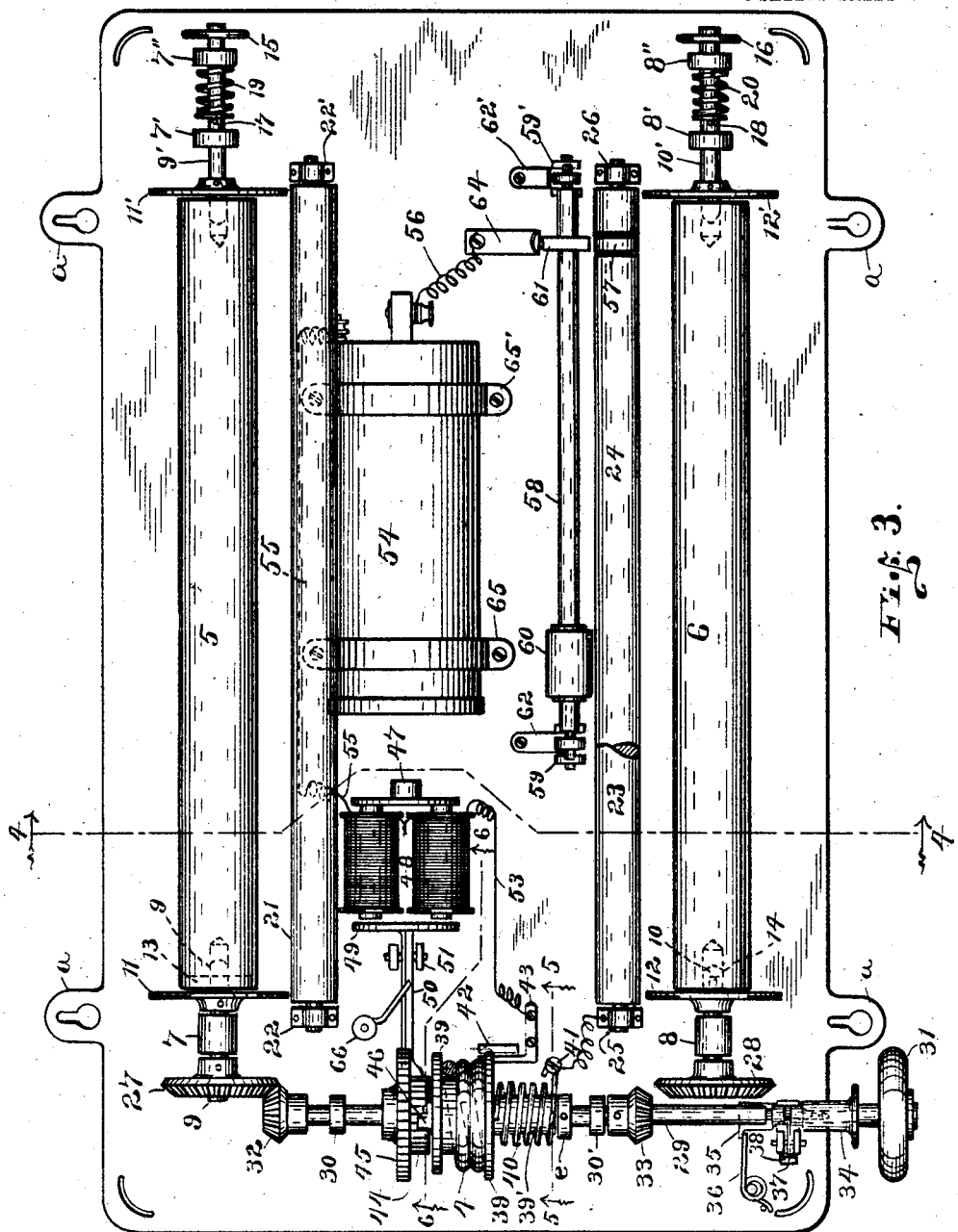

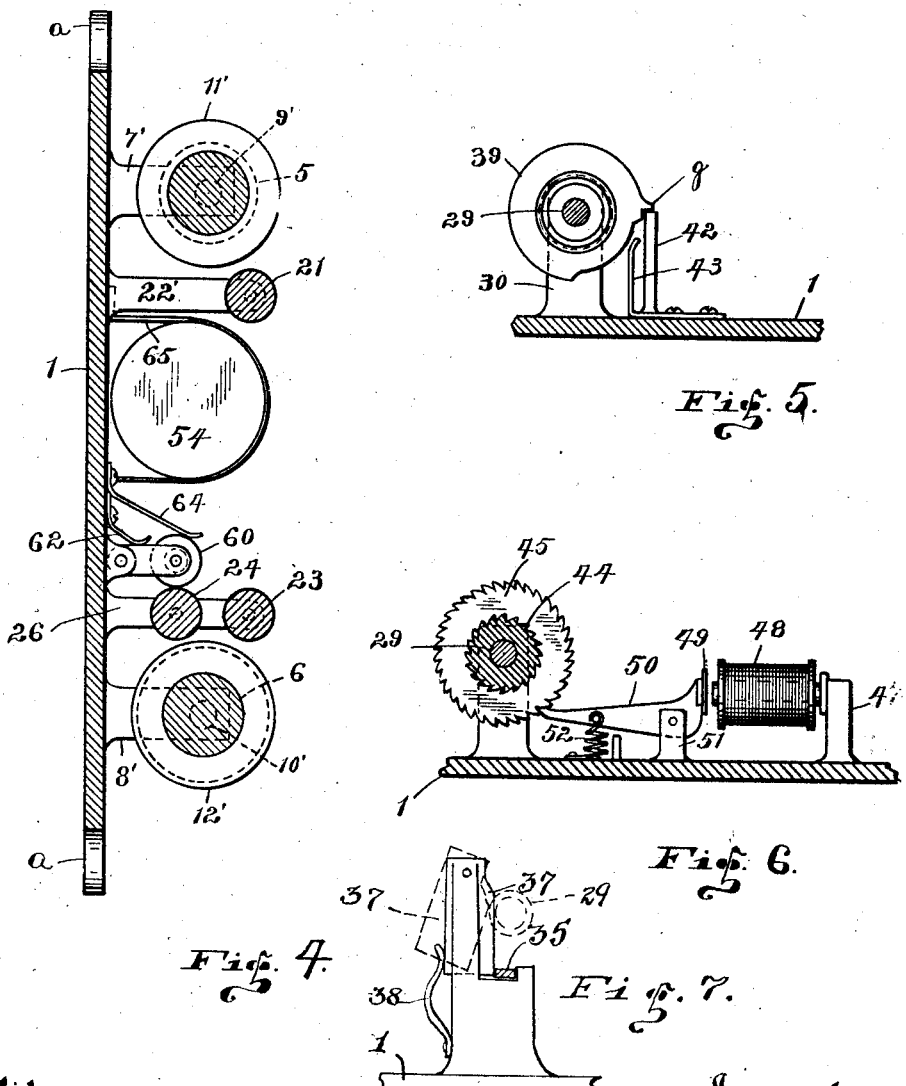

HOMER S. VOTAW, OF LAURIER, WASHINGTON, AND HARRY GLENN COULSON, OF PORTLAND, INDIANA.

STATION-INDICATOR.

1,058,816.　　　　　Specification of Letters Patent.　　Patented Apr. 15, 1913.

Application filed August 20, 1910. Serial No. 578,212.

*To all whom it may concern:*

Be it known that we, HOMER S. VOTAW, of Laurier, Ferry county, Washington, and HARRY GLENN COULSON, of Portland, Jay county, Indiana, both citizens of the United States, have invented a new and useful Station-Indicator, of which the following is a full, clear, and accurate specification and exposition, being such as will enable others to make and use the same with absolute exactitude.

The object of our invention, broadly speaking, is to provide a station indicator for use in cars or the like, which will be strong and durable in construction, positive in action, efficient in operation, easily operated and controlled, and which can be manufactured and sold at a comparatively low price.

More particularly stated our object is to provide a station indicator of comparatively small dimensions, adapted to be secured to the wall on the inside of a railway-car or other vehicle for the purpose of exhibiting to the passengers the names of the various stations progressively as they are approached in progressive succession.

Other minor objects and particular advantages of our invention will be brought out and made apparent in the course of the following specification, and that which is new and useful will be correlated in the appended claim terminating the specification.

The preferred manner for carrying out the objects of our invention and that which in practice we have determined to be the most practical and efficient is shown in the accompanying three-sheets of drawings, in which—

Figure 1:
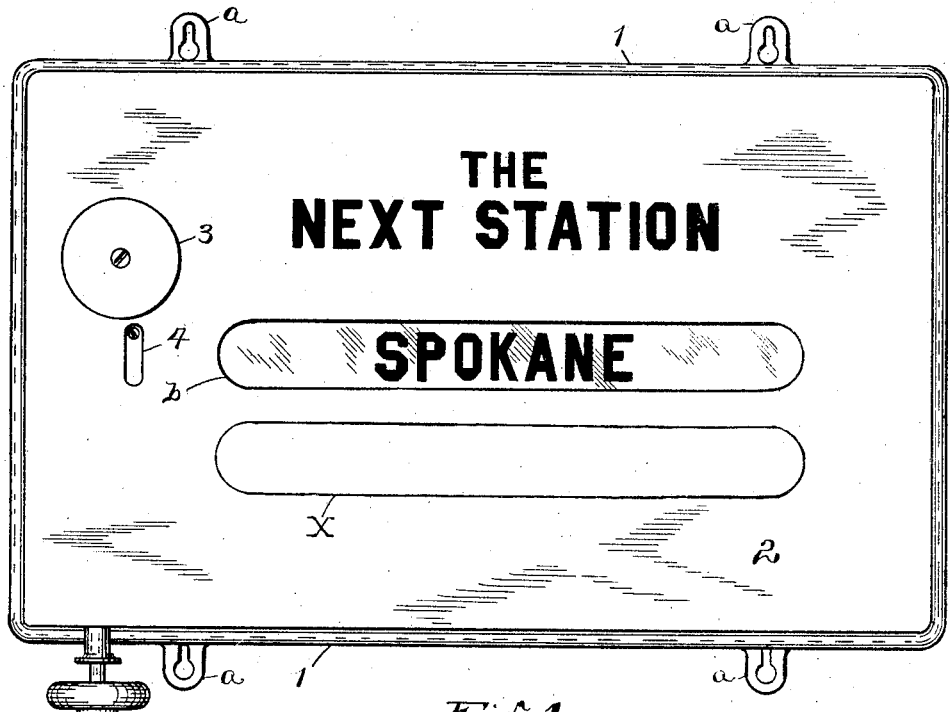
Figure 2:
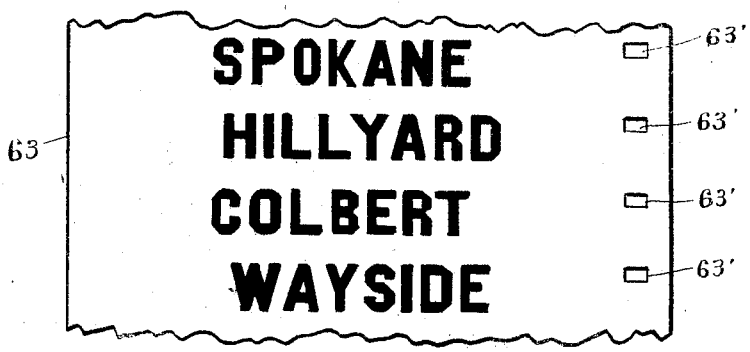

Figure 1 is a front elevation of our invention complete and in operative position. Fig. 2 is a detail view showing a portion of the ribbon on which the names of the stations are printed. Fig. 3 shows the interior mechanism, the cap or front being removed. Fig. 4 shows a cross sectional view through the mechanism, as taken on line 4—4 of Fig. 3. Fig. 5 is a detail section as taken on line 5—5 of Fig. 3. And Fig. 6 is a detail section as taken on line 6—6 of Fig. 3. Fig. 7 is a detail view of the shaft 29 in an adjusted position.

Similar indices denote like parts throughout the several views.

In order that our invention may be more fully understood and its advantages be properly appreciated we will now take up a detail description thereof in which we will set forth the construction and the operation as briefly and as comprehensively as we may.

Referring now to the drawings in detail, numeral 1 denotes the base or back to which the various mechanisms are secured. Extending out at various points from the base 1 are the ears *a* having screw apertures therethrough whereby the invention may be secured in a vertical position to the wall of a car or other vehicle.

Numeral 2 denotes the case or cover, which is of slightly less dimensions than the base 1 to which it is removably secured and by which the several mechanisms, hereinafter referred to, are inclosed, as in Fig. 1. Formed through the central portion of the face of the cap 2 is an elongated, glass covered, aperture *b* through which the various station names may appear. Permanently printed on the face of the cap 2 and located above said glass covered aperture *b* should be a suitable caption, as for instance: "The next station." Mounted on the face of the cap 2, near the left-hand end thereof, is the bell 3, and below the bell an aperture is formed through the cap in which may operate the cord 4 or the like.

Located longitudinally of the back or base 1, near the upper and the lower edges thereof, are the respective rollers 5 and 6, which are carried by suitable brackets 7—7' and 8—8', respectively. Said rollers are detachably connected to the stub shafts 9—9' and 10—10' which are revolubly mounted in the respective brackets above enumerated. Secured on the respective stub-shafts 9, 9', 10 and 10', are the flanges 11, 11', 12 and 12', which are of larger diameter than the rollers 5 and 6 against the ends of which they engage. The inner ends of said stub shafts extend into the ends of the rollers 5 and 6, and the said rollers are caused to revolve with shafts 9 and 10 by means of the respective cross pins 13 and 14, shown at left in Fig. 3. Each of the rollers 5 and 6 is made removable, as indicated more particularly at the right in Fig. 3, whereby shafts 9' and 10' are each carried by an auxiliary bracket 7'' and 8'', respectively, in addition to said brackets 7' and 8' first mentioned. Brackets 7' and 7'' are spaced apart, as are also brackets 8' and 8''. Secured on the outer end of each of the shafts 9' and 10' is a button 15 and 16, respectively, by which said shafts may be moved endwise manually. Disposed through each of the shafts 9' and 10' are pins 17 and 18 respectively, same being located to the right of brackets 7' and 8' respectively, and they form stops, preventing shafts 9' and 10' from being inserted too far into the rollers. Encircling shaft 9' and pressing against pin 17 and bracket 7'' is the helical spring 19; and encircling shaft 10' and pressing against pin 18 and bracket 8'' is the helical spring 20, said springs tending to normally retain the inner ends of said shafts inserted in the ends of the rollers and therefore retaining the rollers resiliently in operative position, but adapted to be removed at any time by moving said buttons 15 and 16 to the right. Mounted below and a little forward of roller 5 is the upper small roller 21 which is slightly longer than roller 5, and it is carried by suitable hangers 22 and 22' and operates idly as hereinafter set forth. Of same size as roller 21 is roller 23 located directly therebelow and near to roller 6 as indicated, and located directly back of roller 23 is roller 24, it also being of same size as roller 21. Rollers 23 and 24 are spaced a short distance apart, and they are both carried revolubly in a single pair of hangers 25 and 26. Secured on the outer end of shaft 9 is the bevel gear wheel 27, and secured on the outer end of shaft 10 is the bevel gear wheel 28.

Numeral 29 denotes a vertical shaft located at right-angles to said shafts 9 and 10 and at the left thereof, same being mounted in suitable hangers 30 and 30' which are secured to the base 1, and said shaft extends down below the lower edge of the base 1, with a hand-wheel 31 secured on its lower end whereby said shaft may be operated manually. Secured on the upper end of shaft 29 is the bevel gear wheel 32 which is adapted to mesh with the bevel gear wheel 27. Also secured on shaft 29 is the bevel gear wheel 33 which is adapted to mesh with the bevel gear wheel 28. The wheels 32 and 33 are so located that only one of them may be in mesh at one time, depending on whether shaft 29 be moved up or down to its limit of endwise movements.

Loosely mounted around shaft 29, a short distance above hand-wheel 31, is the thimble 34 which has a cam-like projection 35 extending upward and engaged by spring 36 which retains the thimble up to its limit. Thimble 34 has a flange on its lower end whereby it may be moved with one's fingers in order to throw the latch 37 out of engagement with one of the two grooves formed around in shaft 29, this being caused by the rear part of the central portion of the hollow stem of the thimble 34 engaging as a cam the right hand portion of latch 37 and forcing it forward away from shaft 29 and retaining it away from shaft 29 until the thimble 34 is released after which spring 36 will raise the thimble 34 and allow the latch 37 to be forced against shaft 29 by spring 38 and consequently causing the right-hand end of the latch 37 to enter one of the grooves in shaft 29 when one of said grooves is brought opposite thereto by the movement up or down of shaft 29, by which the shaft 29 is retained in one or the other of the two positions required (up or down) to cause the bevel gear wheels 32 and 33 to be engaged with their respective gear wheels 27 and 28. Said latch 37 is retained in resilient contact with shaft 29 or in one of said grooves in shaft 29 by means of the spring 38, substantially as indicated.

Numeral 39 denotes a spool which is revolubly mounted on shaft 29, same being prevented from sliding downward by means of the collar $e$ which is secured to the shaft 29, there being a stem 39' formed integral with said spool 39 which extends down around shaft 29 to said collar $e$. A helical spring 40 is coiled around the stem 39', one end of said spring being secured to spool 39 and the other end of said spring is secured by the screw 41 to the base or back 1. Coiled around on the spool 39 is the cord 4 above referred to, the inner end of said cord being secured to the spool and the outer end thereof hanging free outside of the face of the cap where it may be grasped by the operator. The lower flange of spool 39 has about one-fourth of its periphery cut-away or indented, as shown in Fig. 5, also there being a lug $g$ formed to extend out farther than the periphery as shown which lug is adapted to be engaged by the upper end of the post 42, the latter being secured to the base 1. A brush 43 is secured to the base 1 with a flexible portion extending upward and adapted to travel on the normal periphery of the lower flange of spool 39, but it does not engage with the periphery of the lower or cut-away portion of said flange.

Numeral 44 denotes a small ratchet wheel mounted on shaft 29 adjoining the upper flange of spool 39, and formed integral with ratchet-wheel 44 is the larger ratchet-wheel 45 located thereabove. A pawl 46 is pivoted on the upper end of spool 39 and is adapted to engage the teeth of ratchet-wheel 44.

Carried by post 47 is the magnet 48 having the armature 49, the latter being carried by the arm 50. Arm 50 is pivoted in hanger 51 which is attached to base 1. The left-hand end of arm 50 forms a pawl which is adapted to engage the notches in the ratchet-wheel 45. The arm 50 is normally retained out of engagement with ratchet-wheel 45 by means of the spring 52 which is secured thereto and to the base 1, it also normally retains the armature 49 from contact with the magnets. One pole of magnets 48 is connected to the brush 43 by means of the wire 53. Numeral 54 denotes an electric dry-battery, to which the other pole of magnet 48 is connected by the wire 55, shown mostly in dotted lines in Fig. 3. Said wire 55 is connected to one pole of battery 54, while to the other pole of said battery is connected the wire 56. Disposed around the roller 24, near the right-hand end thereof, is the contact band 57.

Numeral 58 denotes a relatively short shaft mounted directly above roller 24, extending to the right-hand end thereof, and it is carried by the two brackets 59 and 59'. A relatively short friction roller 60 is secured on shaft 58 near the left hand end thereof, which is adapted to contact with roller 24 near the center thereof. Also secured on shaft 58 is the small contact roller 61 which contacts with the band 57. Springs 62 and 62' acting on shaft 58 tend to hold rollers 60 and 61 firmly, but revolubly, against the ribbon 63 as it passes over roller 24.

Numeral 64 denotes a brush secured to base 1 with its point contacting with the small roller 61, and one end of the wire 56 is secured to said brush 64. While brushes 43 and 64 are secured to base 1 they are insulated therefrom, as is also roller 61 insulated from shaft 58.

The battery 54 is secured to the base 1 by means of the strips 65 and 65', and it is located near the center of the base about midway between rollers 5 and 6. Other sources of electric current may be used where advisable in place of the battery, as for instance on electric cars or on electrically lighted coaches.

The ribbon 63 is to be wound on rollers 5 and 6 and is to be run from one to the other, passing over rollers 21 and 23, back and around on roller 24, roller 60 holding the ribbon tightly in contact with roller 24. Printed an equal distance apart upon the face of ribbon 63 are the names of the several stations located along the line upon which our invention is to be used, same being placed progressively in order. A plurality of apertures 63' are formed along through the right-hand edge of the ribbon 63, one of said apertures being located opposite the name of each station, as shown in Fig. 2. Said apertures are so located as to come opposite to the band 57 and the roller 61 whereby said band and roller may contact with each other through each of said apertures in the ribbon as the ribbon travels from end to end. Attached to and extending out from arm 50 through the face of the case is the tapper 66 which is adapted to strike the bell 3 whenever the armature is attracted by the magnets.

In some instances we have found it desirable to employ an advertisement in connection with the announcement of each station, for which purpose an aperture $x$, shown in dotted lines in Fig. 1, may be formed through the cap 2 and located immediately below said aperture $b$, and then between each two names of stations on ribbon 63 an advertisement may be printed which will be exhibited through said aperture $x$. For instance said advertisement may take the place of each alternate station name, as in the place of "Hillyard" and "Wayside", or the names of the stations may be placed farther apart as desired. In practice the advertisement exhibited through aperture $x$ should be characteristic of or applicable to the station whose name appears next above. In other words the name of the station appearing through aperture $b$ and the advertisement appearing through aperture $x$ should be related.

Operation: Suppose that the machine be arranged substantially as shown in the drawings, the word "Spokane" appearing as the next station. After passing "Spokane" the operator will pull on cord 4, which will revolve spool 39 against the resiliency of spring 40, the pawl 46 will engage ratchet-wheel 44 thereby causing the ratchet-wheel 45 to rotate therewith, and as the latter is secured to shaft 29 it is apparent that said shaft will be rotated therewith. The rotation of shaft 29 to the left will turn the miter gear wheel 32 which, acting on the miter gear wheel 27, will revolve the roller 5, thereby drawing the ribbon upward, and from off roller 6. Now as the ribbon 63 moves upward the word "Hillyard", representing the name of the next station, will be brought to position in the sight aperture $b$, and simultaneously therewith aperture 63' in the ribbon opposite the word "Hillyard" will allow the roller 61 to contact with band 57. Now at this time the brush 43 will, manifestly, be in contact with the periphery of the lower flange of spool 39 thereby completing the electric circuit and causing the magnets to become magnetized thereby attracting the armature 49 thereto and throwing the point of arm 50 into engagement with the teeth of ratchet-wheel 45, thereby stopping the rotation of the roller 5, consequently stopping the movement of the ribbon at the exact point to expose the word "Hillyard", and at same time causing the tapper 66 to strike bell 3 which will notify the operator that the cord has been pulled far enough, and also serving to call the attention of the passengers to the station name displayed.

As the operator now releases cord 4 the spring 40 will revolve the spool 39 back to its former position with the lug $j$ resting on top of post 42, which will stop further rotation backward of the spool. This last movement will of course break the electric circuit as the spool 39 will be so turned that the brush 43 will be out of contact therewith, as shown in Fig. 5, thereby allowing the armature 49 to be moved away from the magnet by the spring 52, and also releasing the point of arm 50 from engagement with ratchet-wheel 45. As station "Hillyard" is passed the operator will again pull cord 4 causing the ribbon to again move upward until the word "Colbert" is in full view, when the electric circuit will again be established forming a complete circuit thereby stopping further movement as before. When all of the stations have been passed in one direction, or for any other reason one desires to reverse the movement of the ribbon, then all that is necessary is for the operator to grasp the hand-wheel 31, with his fingers pull down on the thimble 34 which releases the latch 37, and then pull downward until the latch 37 engages in the upper groove of the two formed in shaft 29, which will move the gear wheel 32 out of engagement with gear wheel 27, and at same time moving gear wheel 33 into engagement with gear wheel 28. After the last named movements it is apparent that by pulling the cord 4 the ribbon will operate downward, as it will be wound upon roller 6, thereby causing the names of the stations to appear in reverse order.

By reason of the above described construction, whereby the movements of the ribbon is stopped electrically at the proper point, it is apparent that we overcome previous difficulties, as in this instance the constantly increasing volume of ribbon accumulating on one or the other of rollers 5 and 6 will make no difference in the operation of the device. When it is desired to change the ribbon for one with different station names, then the front of the case may be opened, the old ribbon is all wound on one roller, roller 5 for instance, by turning hand-wheel 31, then by pulling to the right on button 15, against the resiliency of spring 19, the shaft 9' will be pulled out of the end of the roller 5 far enough so that the roller may be lifted out. The roller carrying the new ribbon is next placed with slotted end on the end of shaft 9, then swung into line and shaft 9' allowed to spring back into place. The end of the ribbon is next carried over rollers 21, 23 and 24, and then connected to roller 6, and the device will then be ready for operation.

We desire that it be understood that while we have shown and described a specific construction, yet we reserve the right to change the several details of construction within the scope of the appended claim without departing from the spirit of our invention or sacrificing any of the advantages thereof.

Having now fully shown and described our invention and its operation, what we claim and desire to secure by Letters Patent of the United States, is—

A station indicator comprising a base having a casing provided with a sight opening, a ribbon with the names of stations thereon, a pair of revoluble rollers mounted in the casing and having said ribbon wound thereon, a shaft adapted to be operatively engaged with either of said rollers independently for rotating the latter in reverse directions, means for rotating the shaft to present one of the names at the opening and comprising in part a rotatable spool having a partially recessed periphery and means for automatically stopping the ribbon simultaneously with the appearance of a name at the opening, said means comprising an electrical circuit having a suitable source of power, a pair of guide rollers adjacent one of said ribbon carrying rollers for receiving the ribbon, a contact band carried by one of said guide rollers, another roller mounted adjacent said band carrying guide roller, a second band carried thereby and positioned to engage with the first band, said ribbon passing between said contact band carrying rollers and having apertures in alinement with said bands adapted to permit contact therebetween, a brush included in the circuit and engaging the band on the second roller, a ratchet wheel on the shaft, a magnet having an arm disengaged from the wheel and a contact arranged in the circuit and disposed adjacent the spool normally opposite the recessed portion thereof and out of contact therewith and in position to be engaged by the spool when the same is rotated to close the circuit for energizing the magnet and moving the arm into engagement with the wheel.

In testimony whereof we have hereunto subscribed our names to this specification in the presence of two subscribing witnesses.

HOMER S. VOTAW.
H. GLENN COULSON.

Witnesses:
ALEX. A. ANDERSON,
CECIL YOUNG.